(12) United States Patent
Tachibana et al.

(10) Patent No.: US 9,905,219 B2
(45) Date of Patent: Feb. 27, 2018

(54) SPEECH SYNTHESIS APPARATUS, METHOD, AND COMPUTER-READABLE MEDIUM THAT GENERATES SYNTHESIZED SPEECH HAVING PROSODIC FEATURE

(71) Applicant: KABUSHIKI KAISHA TOSHIBA, Minato-ku, Tokyo (JP)

(72) Inventors: Kentaro Tachibana, Yokohama (JP); Takehiko Kagoshima, Yokohama (JP); Masahiro Morita, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 179 days.

(21) Appl. No.: 13/968,482

(22) Filed: Aug. 16, 2013

(65) Prior Publication Data

US 2014/0052447 A1    Feb. 20, 2014

(30) Foreign Application Priority Data

Aug. 16, 2012    (JP) .................................. 2012-180466

(51) Int. Cl.
*G10L 13/00*    (2006.01)
*G10L 13/08*    (2013.01)
*G10L 13/10*    (2013.01)

(52) U.S. Cl.
CPC .............. *G10L 13/08* (2013.01); *G10L 13/10* (2013.01); *Y02P 70/54* (2015.11)

(58) Field of Classification Search
CPC ................................. G10L 13/00; G10L 13/08
(Continued)

(56) References Cited

U.S. PATENT DOCUMENTS 7,318,034 B2 * 1/2008 Sato .............................. 704/265
2001/0032078 A1 * 10/2001 Fukada ......................... 704/258
(Continued)

FOREIGN PATENT DOCUMENTS

CN    101156196 A    4/2008
CN    101490740 A    7/2009
(Continued)

OTHER PUBLICATIONS

Japanese First Office Action dated Jun. 24, 2014 from corresponding Japanese Patent Application No. 2012-180446, 4 pages.
(Continued)

*Primary Examiner* — Shaun Roberts
(74) *Attorney, Agent, or Firm* — Ohlandt, Greeley, Ruggiero & Perle, L.L.P.

(57) ABSTRACT

According to one embodiment, a speech synthesis apparatus is provided with generation, normalization, interpolation and synthesis units. The generation unit generates a first parameter using a prosodic control dictionary of a target speaker and one or more second parameters using a prosodic control dictionary of one or more standard speakers based on language information for an input text. The normalization unit normalizes the one or more second parameters based a normalization parameter. The interpolation unit interpolates the first parameter and the one or more normalized second parameters based on weight information to generate a third parameter and the synthesis unit generates synthesized speech using the third parameter.

17 Claims, 7 Drawing Sheets

(58) Field of Classification Search
USPC .................................................. 704/258–269
See application file for complete search history.

(56) References Cited

U.S. PATENT DOCUMENTS

| | | | |
|---|---|---|---|
| 2003/0028376 A1* | 2/2003 | Meron | 704/258 |
| 2008/0195391 A1 | 8/2008 | Marple et al. | |
| 2008/0201150 A1* | 8/2008 | Tamura et al. | 704/266 |
| 2009/0037179 A1* | 2/2009 | Liu et al. | 704/260 |
| 2009/0254349 A1 | 10/2009 | Hirose et al. | |
| 2011/0087488 A1 | 4/2011 | Morinaka et al. | |

FOREIGN PATENT DOCUMENTS

| | | |
|---|---|---|
| EP | 1 014 337 A2 | 6/2000 |
| JP | 2001-242882 A | 9/2001 |
| JP | 2010-117528 A | 5/2010 |
| JP | 2010-224498 A | 10/2010 |

OTHER PUBLICATIONS

Chinese First Office Action dated Sep. 25, 2015 from corresponding Chinese Patent Application No. 201310357397.5, 13 pages.

* cited by examiner

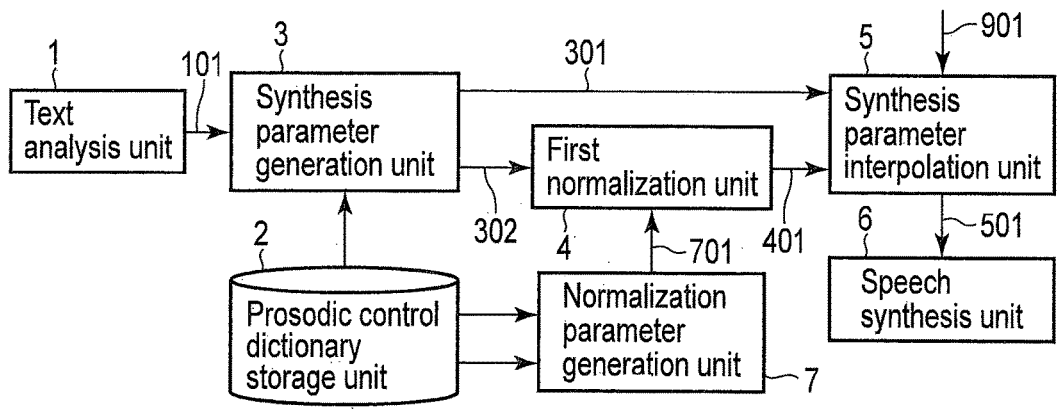
F I G. 1 1
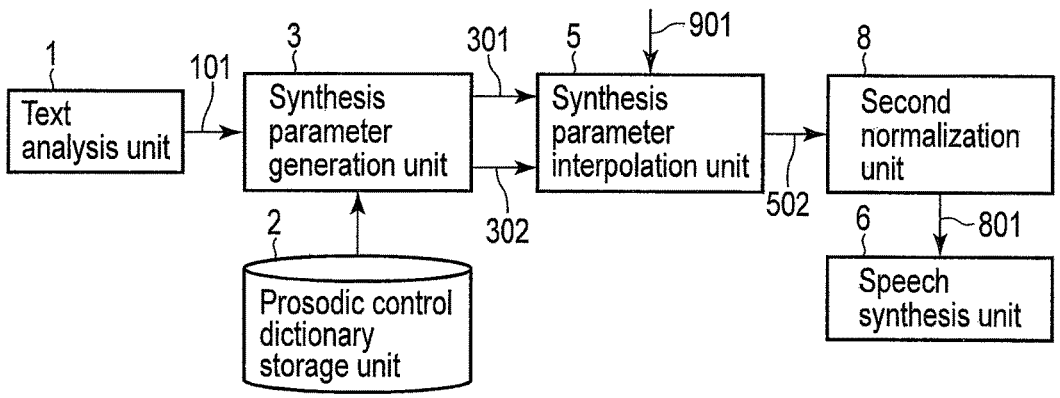
F I G. 1 2
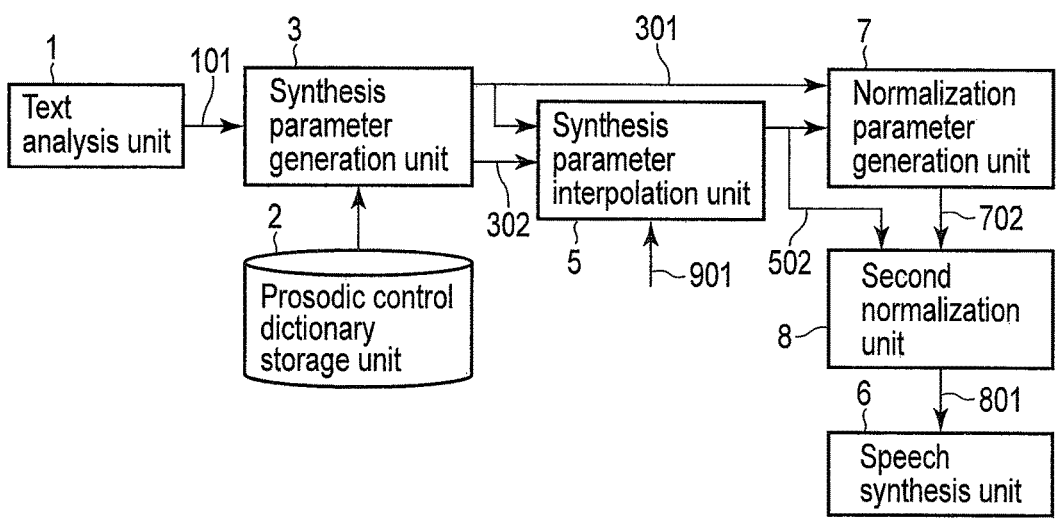
F I G. 1 3

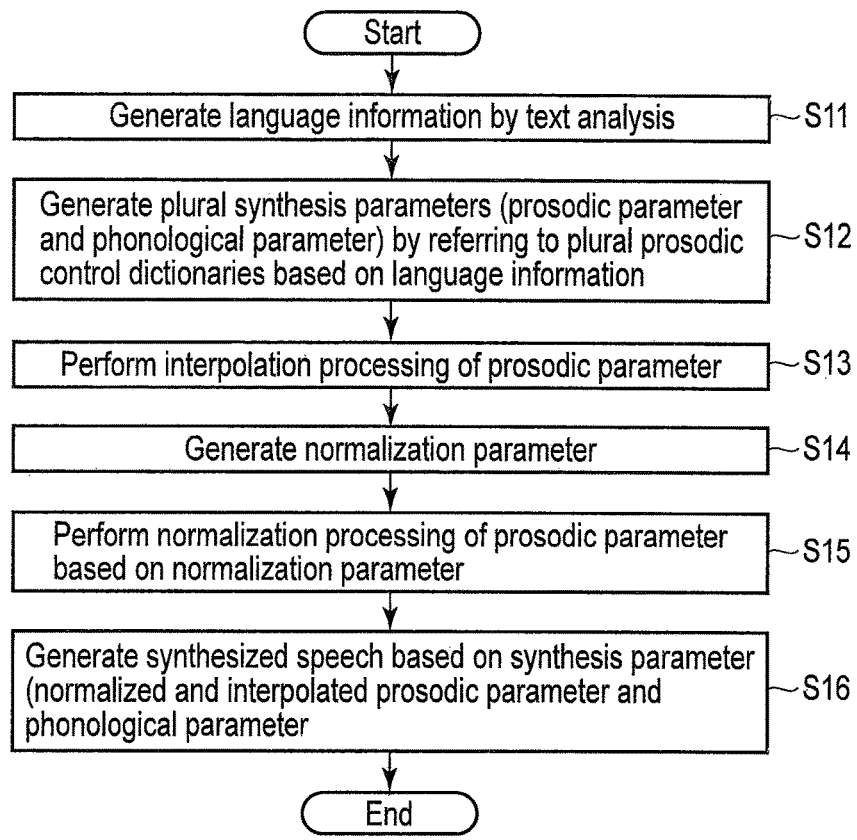
F I G. 14
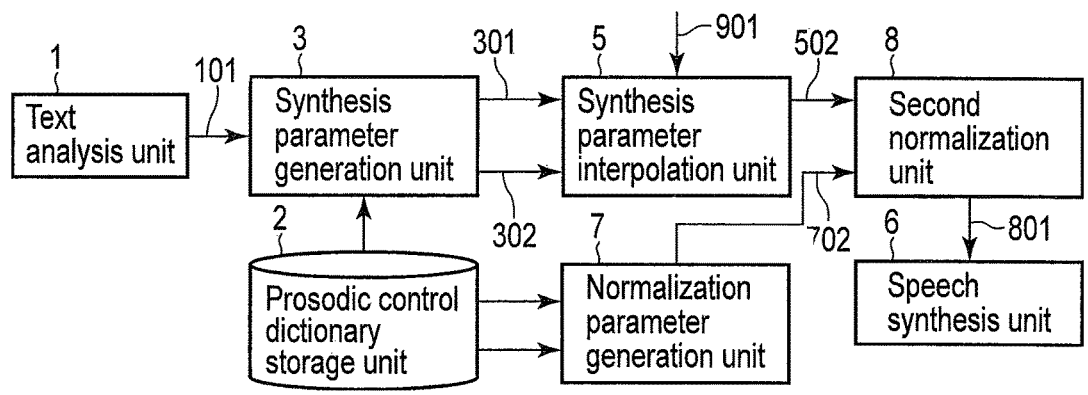
F I G. 15

SPEECH SYNTHESIS APPARATUS, METHOD, AND COMPUTER-READABLE MEDIUM THAT GENERATES SYNTHESIZED SPEECH HAVING PROSODIC FEATURE

CROSS-REFERENCE TO RELATED APPLICATIONS

This application is based upon and claims the benefit of priority from Japanese Patent Application No. 2012-180446, filed Aug. 16, 2012, the entire contents of which are incorporated herein by reference.

FIELD

Embodiments described herein relate to a speech synthesis apparatus, method, and program.

BACKGROUND

Artificially creating a speech signal from an arbitrary text will be referred to as text-to-speech synthesis. Normally, text-to-speech synthesis is performed by three steps of text analysis, synthesis parameter generation, and speech synthesis.

In a typical text-to-speech synthesis system, first, a text analysis unit performs morphological analysis and parsing or the like of an input text and outputs language information. The language information includes phonetic symbol strings corresponding to the reading of the text, information of accent phrases serving as units of prosodic control, accent positions, and parts of speech. Next, the synthesis parameter generation unit generates synthesis parameters by performing prosodic control while referring to a prosodic control dictionary based on the language information. The synthesis parameters include prosodic parameters such as a fundamental frequency pattern (F0 pattern), phoneme duration, and power, and phonological parameters such as a phonemic symbol string. The speech synthesis unit generates synthesized speech in accordance with the synthesis parameters.

Such text-to-speech synthesis usually synthesizes speech having a tone as in text reading by human (so-called reading style). There are recently proposed a number of methods of implementing a variety of prosodic features. For example, a method is proposed which generates new prosodic parameters by performing interpolation processing between a plurality of prosodic parameters, and generates synthesized speech using these prosodic parameters, thereby offering synthesized speech having a variety of prosodic features.

In this method, however, the interpolation result may be inappropriate depending on the relationship between the prosodic parameters (for example, when the features amounts of the prosodic parameters have a large difference). For example, an F0 pattern will be exemplified as a prosodic parameter. Assume that interpolation is performed between the prosodic parameter of a male target speaker and that of a female speaker. Since the F0 pattern is generally higher in women, the F0 average value of the prosodic pattern generated by interpolation becomes higher than the average value of the F0 pattern of the target speaker (male speaker). As a result, the personality of the speaker is lost in the generated prosodic parameter.

BRIEF DESCRIPTION OF THE DRAWINGS

FIG. 11 is a block diagram of the second arrangement example of the first embodiment;

FIG. 12 is a basic block diagram of a speech synthesis apparatus according to the second embodiment;

FIG. 13 is a block diagram of the first arrangement example of the second embodiment;

FIG. 14 is a flowchart showing an operation example of the speech synthesis apparatus according to the second embodiment; and FIG. 15 is a block diagram of the second arrangement example of the second embodiment.

DETAILED DESCRIPTION

Figure 1:
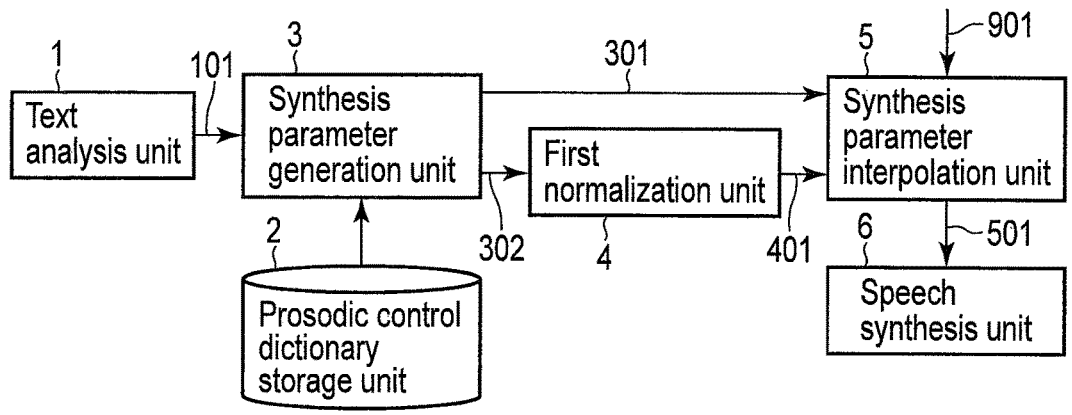
FIG. 1 is a basic block diagram of a speech synthesis apparatus according to the first embodiment.

A speech synthesis apparatus according to an embodiment of the present invention will now be described in detail with reference to the accompanying drawings. Note that in the following embodiment, parts denoted by the same reference numbers perform the same operations, and a repetitive description thereof will be omitted.

According to one embodiment, a speech synthesis apparatus is provided with a text analysis unit, a dictionary storage unit, a prosodic parameter generation unit, a normalization unit, a prosodic parameter interpolation unit and a speech synthesis unit. The text analysis unit analyzes an input text and outputs language information. The dictionary storage unit stores a first prosodic control dictionary of a target speaker and a second prosodic control dictionary of one standard speaker or each of a plurality of standard speakers. The prosodic parameter generation unit generates a first prosodic parameter using the first prosodic control dictionary and generates one or a plurality of second prosodic parameters using the second prosodic control dictionary, based on the language information. The normalization unit normalizes the one or the plurality of second prosodic parameters based a normalization parameter. The prosodic parameter interpolation unit interpolates the first prosodic parameter and the one or the plurality of normalized second prosodic parameters based on weight information to generate a third prosodic parameter. The speech synthesis unit generates synthesized speech in accordance with the third prosodic parameter.

According to this embodiment, it is possible to generate synthesized speech having a variety of prosodic features and maintain the personality of a speaker.

According to another embodiment, a speech synthesis apparatus is provided with a text analysis unit, a dictionary storage unit, a prosodic parameter generation unit, a prosodic parameter interpolation unit, a normalization unit and a speech synthesis unit. The text analysis unit analyzes an input text and outputs language information. The dictionary storage unit stores a first prosodic control dictionary of a target speaker and a second prosodic control dictionary of one standard speaker or each of a plurality of standard speakers. The prosodic parameter generation unit generates a first prosodic parameter using the first prosodic control dictionary and generates one or a plurality of second prosodic parameters using the second prosodic control dictionary, based on the language information. The prosodic parameter interpolation unit interpolates the first prosodic parameter and the one or the plurality of second prosodic parameters based on weight information to generate a third prosodic parameter. The normalization unit normalizes the third prosodic parameter based a normalization parameter. The speech synthesis unit generates synthesized speech in accordance with the normalized third prosodic parameter.

According to this embodiment, it is possible to generate synthesized speech having a variety of prosodic features and maintain the personality of a speaker.

As will be described later in detail, normalization processing is performed before interpolation processing of prosodic parameters in the first embodiment, and normalization processing is performed after interpolation processing of prosodic parameters in the second embodiment.

(First Embodiment)

The first embodiment will be described.

FIG. 1 is an example of the block diagram of a speech synthesis apparatus according to the first embodiment.

As shown in FIG. 1, the speech synthesis apparatus according to this embodiment includes a text analysis unit 1, a prosodic control dictionary storage unit 2, a synthesis parameter generation unit 3, a normalization unit (to be referred to as a first normalization unit hereinafter) 4 that performs normalization processing before interpolation processing, a synthesis parameter interpolation unit 5, and a speech synthesis unit 6.

Note that FIG. 1 mainly illustrates components concerning prosodic parameters out of synthesis parameters, and portions concerning other parameters or information are not illustrated as needed. This also applies to other drawings. The following description will also be made mainly for the prosodic parameters.

An F0 pattern will be exemplified below when explaining processing associated with the prosodic parameters.

In this embodiment, various arrangement examples are available for normalization parameter generation, etc. Several arrangement examples will be described below in order. Details of each unit of the speech synthesis apparatus according to this embodiment will be explained in the following description.

(First Arrangement Example of First Embodiment)

The first arrangement example of this embodiment will be described first.

Figure 2:
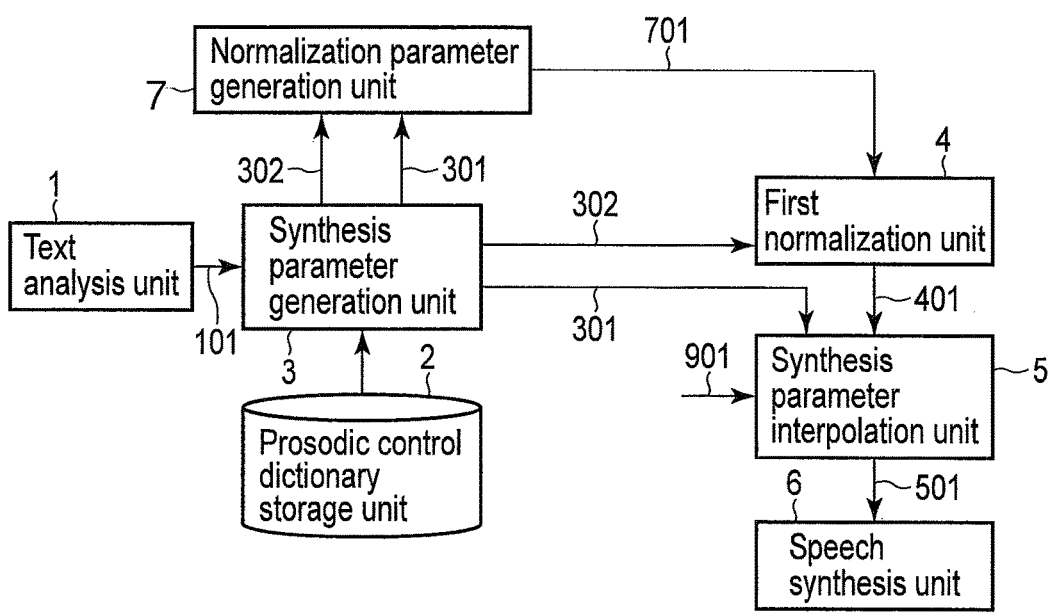
FIG. 2 is a block diagram of the first arrangement example of the first embodiment.

FIG. 2 is a block diagram of a speech synthesis apparatus of this arrangement example.

As shown in FIG. 2, the speech synthesis apparatus of this arrangement example includes the text analysis unit 1, the prosodic control dictionary storage unit 2, the synthesis parameter generation unit 3, a normalization parameter generation unit 7, the first normalization unit 4, the synthesis parameter interpolation unit 5, and the speech synthesis unit 6.

Each unit will be described below.

The text analysis unit 1 performs linguistic processing (for example, performs morphological analysis and parsing) of an input text (character string) and generates language information 101.

The language information includes various kinds of information necessary for synthesis parameter generation such as phonetic symbol strings corresponding to the reading of the text, information of accent phrases serving as units of prosodic control, accent positions, and parts of speech.

The prosodic control dictionary storage unit 2 stores the prosodic control dictionary of one target speaker and the prosodic control dictionaries of n standard speakers. In this case, n is an arbitrary number of 1 or more. The prosodic control dictionary of the target speaker includes parameters used to control the prosody of the target speaker. The prosodic control dictionary of one standard speaker includes parameters used to control the prosody of the standard speaker. Note that there is no structural difference between the prosodic control dictionary of the target speaker and the prosodic control dictionaries of the standard speakers. More specifically, the prosodic control dictionary is referred to control the prosody such as the F0 pattern, phoneme duration, power, and pause of synthesized speech. The parameters can be, for example, the typical change pattern of the F0 pattern, parameters of statistical models of control amounts such as accent component, phoneme duration, power, and pause duration, a rule expressed by a decision tree, or the like (however, the parameters are not limited to those).

Note that the prosodic control dictionary storage unit 2 may store the prosodic control dictionaries of a plurality of target speakers so that the prosodic control dictionary of one target speaker to be used can be selected (for example, in accordance with a user instruction). The prosodic control dictionaries of target speakers other than the target speaker to be used can also be used as the prosodic control dictionaries of standard speakers.

The synthesis parameter generation unit 3 generates the synthesis parameters (a phonological parameter and a first prosodic parameter) of the target speaker by referring to the prosodic control dictionary of the target speaker based on the language information 101, and similarly generates the synthesis parameters (a phonological parameter and a second prosodic parameter) of each standard speaker by referring to the prosodic control dictionary of each standard speaker based on the language information 101. The prosodic parameter generation unit is part of the synthesis parameter generation unit 3.

The synthesis parameters include a prosodic parameter and a phonological parameter. The prosodic parameter is a set of parameters such as a fundamental frequency pattern (F0 pattern), phoneme duration, power, and pause, which characterize the prosody of synthesized speech. The phonological parameter is a phonetic symbol string or the like.

Note that the prosodic parameter can change between speakers and is generated for each speaker. On the other hand, the phonological parameter is normally the same independently of the speaker. However, the phonological parameter may be generated for each speaker. Once the phonological parameter is generated, phonological parameter generation may be omitted.

The normalization parameter generation unit 7 generates a predetermined normalization parameter 701 based on a prosodic parameter (first prosodic parameter) 301 of the target speaker and a prosodic parameter (second prosodic parameter) 302 of one or each of a plurality of standard speakers. The normalization parameter 701 is generated for each of the prosodic parameters of the standard speakers.

The first normalization unit 4 performs normalization processing based on the normalization parameter 701 for each of the generated prosodic parameters 302 of the standard speakers.

In this case, normalization processing indicates, for example, processing wherein for each of the prosodic parameters 302 of the individual standard speakers, one or more feature amounts of the prosodic parameter 302 and the prosodic parameter 301 of the target speaker are made close to a predetermined threshold (or match). The feature amount can be, for example, an average value, a variance, a dynamic range, or the like.

When performing normalization processing for a plurality of types of prosodic parameters, the normalization parameter 701 is generated for each type of prosodic parameter.

The synthesis parameter interpolation unit 5 performs interpolation processing for the prosodic parameter (first prosodic parameter) 301 of the target speaker and a normalized prosodic parameter (normalized second prosodic parameter) 401 of each standard speaker based on arbitrary weight information 901 to generate a third prosodic parameter, and outputs a synthesis parameter 501 including the third prosodic parameter and the phonological parameter. The prosodic parameter interpolation unit is part of the synthesis parameter interpolation unit 5.

The interpolation processing of the prosodic parameters indicates processing of, for example, performing weighted averaging between a plurality of prosodic parameters, thereby generating an intermediate prosodic parameter of those prosodic parameters. The term "interpolation processing" used here includes not only a case in which the weight is positive but also a case in which a negative weight exists (so-called extrapolation processing). When a negative weight exists, the generated prosodic parameter may further enhance the feature of the prosodic parameter of certain speaker. Note that in the following description, the term "extrapolation processing" may be used to make the description while distinguishing interpolation processing performed when a negative weight exists from interpolation processing performed when all weights are positive.

The interpolation processing can be performed for all types of prosodic parameters or some types of parameters (for example, only F0 patterns). As for a prosodic parameter that does not undergo the interpolation processing, for example, the prosodic parameter of the target speaker may directly be employed.

All types of prosodic parameters to be interpolated may also undergo the normalization processing as well. Instead, only some of the prosodic parameters to be interpolated may undergo the normalization processing as well.

The weight at the time of interpolation may be commonly designated independently of the type of the prosodic parameters. For example, the weight at the time of interpolation may be set identically for the F0 pattern and the phoneme duration. Alternatively, the weight at the time of interpolation may be designated for each type of prosodic parameters. For example, the weight at the time of interpolation may be changed between the F0 pattern and the phoneme duration.

Note that, for example, the weight information may be constant for one sentence. Alternatively, the weight information may change in one sentence.

The speech synthesis unit 6 generates synthesized speech in accordance with phonological information and prosodic information designated by the synthesis parameter 501.

An operation example of this arrangement example will be described next with reference to FIG. 3.

In this case, an F0 pattern is used as a detailed example of the prosodic parameter. As described above, however, the prosodic parameter is not limited to this.

First, the text analysis unit 1 generates the language information 101 (step S1).

Next, the synthesis parameter generation unit 3 generates the synthesis parameter of each speaker by referring to the prosodic control dictionary of the target speaker and the prosodic control dictionary of at least one standard speaker based on the language information 101 (step S2).

Note that the dictionary (F0 pattern control dictionary) to control the F0 pattern is stored in the prosodic control dictionary. The prosodic control dictionary can be configured to store a representative F0 pattern for each accent phrase and select a representative F0 pattern based on the generated language information 101.

Next, the normalization parameter generation unit 7 dynamically generates the normalization parameter 701 for each of the prosodic parameters of the standard speakers (step S3).

The first normalization unit 4 normalizes each of the prosodic parameters 302 of the standard speakers using the normalization parameter 701 (step S4).

A detailed example of normalization parameter generation and normalization processing will be described here.

Figure 4:
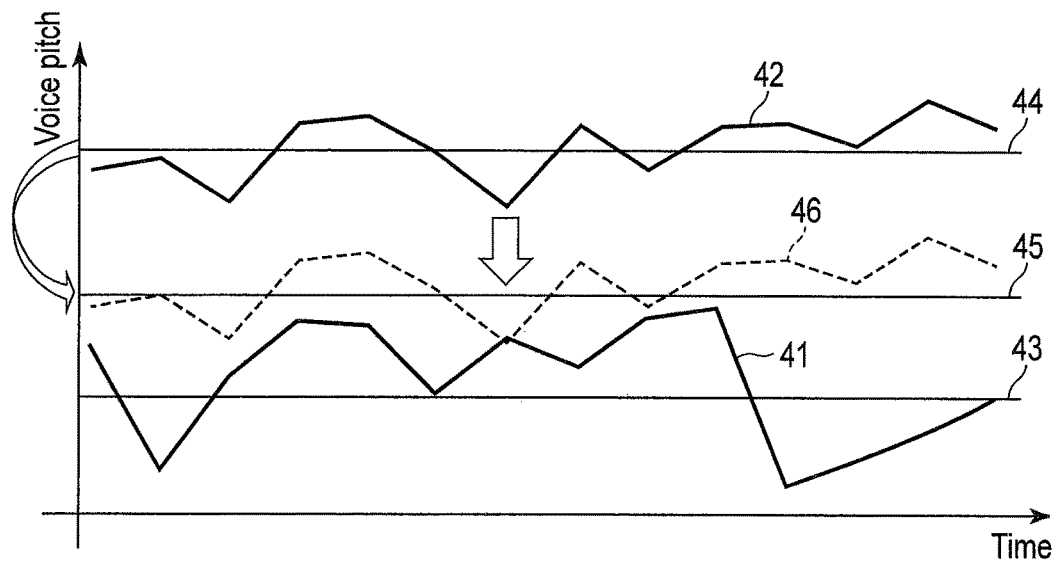
FIG. 4 is a timing chart for explaining a normalization method based on an average value.

As normalization processing, for example, a method using the average value of the F0 pattern is used. For example, on the basis of the average value of the F0 pattern of a standard speaker, the difference from the average value of the F0 pattern of the target speaker (or, for example, a value obtained by adding a predetermined threshold to the difference or a value obtained by multiplying the difference by a predetermined threshold) may be used as the normalization parameter. For example, referring t FIG. 4, reference number 41 denotes a locus of the F0 pattern of the target speaker; 42, a locus of the F0 pattern of a standard speaker; 43, an average of the F0 pattern of the target speaker; and 44, an average of the F0 pattern of the standard speaker. The normalization parameter is, for example, a difference d (=average 43 of F0 pattern of target speaker−average 44 of F0 pattern of standard speaker). In this case, the difference d is added to the F0 pattern of the standard speaker, thereby generating the normalized F0 pattern of the standard speaker. This allows to make the average 43 of the F0 pattern of the target speaker match the average 44 of the F0 pattern of the standard speaker.

Alternatively, for example, when the normalization parameter is set to difference d+threshold Thre, difference d+threshold Thre is added to the F0 pattern of the standard speaker, thereby generating the normalized F0 pattern of the standard speaker. This allows to make the average of the F0 pattern of the target speaker and the average of the F0 pattern of the standard speaker close to the difference of the threshold Thre. Reference number 45 in FIG. 4 denotes a level obtained by adding the threshold Thre to the average 43 of the F0 pattern of the target speaker; and 46, a normalized F0 pattern of the standard speaker.

For example, when the target speaker is a man, and the standard speaker is a woman, normalization is performed such that the average of the F0 pattern of the female speaker matches (or becomes close to) the average of the F0 pattern of the male speaker. This enables to maintain the personality of the target speaker.

Figure 5:
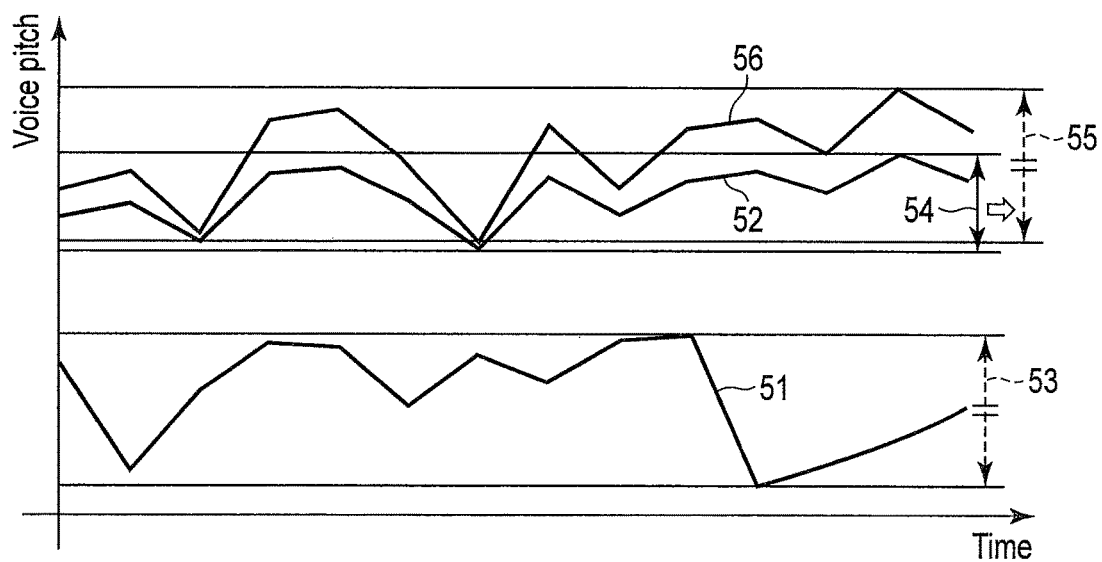
FIG. 5 is a timing chart for explaining a normalization method based on a dynamic range.

As another normalization processing, for example, a method using the dynamic range of the F0 pattern is used. For example, the above-described average value is changed to a dynamic range, and the above-described difference is changed to a ratio. For example, referring to FIG. 5, reference number 51 denotes a locus of the F0 pattern of the target speaker; 52, a locus of the F0 pattern of a standard speaker; 53, a dynamic range of the F0 pattern of the target speaker; and 54, a dynamic range of the F0 pattern of the standard speaker. In this case, first, the dynamic range 53 is calculated from the maximum value and minimum value of the F0 pattern of the target speaker, and the dynamic range 54 is calculated from the maximum value and minimum value of the F0 pattern of the standard speaker. Next, on the basis of the calculated dynamic range 54 of the standard speaker, a ratio α of the dynamic range 54 of the standard speaker to the dynamic range 53 of the target speaker is calculated to obtain the normalization parameter. Then, the F0 pattern 51 of the standard speaker is multiplied by the ratio a, thereby generating the normalized F0 pattern of the standard speaker. This allows to make the normalized dynamic range of the F0 pattern of the standard speaker match the dynamic range of the F0 pattern of the target speaker. Reference number 55 in FIG. 5 denotes a normalized dynamic range of the F0 pattern of the target speaker; and 56, a normalized F0 pattern of the standard speaker.

Note that the ratio may further be adjusted, like the case in which the average value is used. For example, the normalization parameter may be obtained by adding a predetermined threshold to the ratio or multiplying it by a predetermined threshold.

The normalization processing may be performed using both the average value and dynamic range of the F0 pattern.

Various kinds of normalization processing methods other than those described above are also possible.

Next, the synthesis parameter interpolation unit 5 performs interpolation processing of the prosodic parameter 301 of the target speaker and the normalized prosodic parameter 401 of each standard speaker based on the arbitrary weight information 901 (step S5).

Note that the weight is set one by one in correspondence with each synthesis parameter (each speaker). The weight designation method is not particularly limited, and various methods are usable. The individual weight values may be input, or a graphical user interface (GUI) element such as an adjusting bar may be used.

Figure 6:
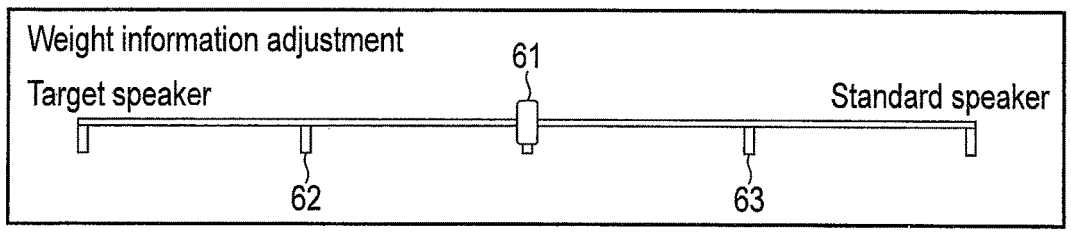
FIG. 6 is a view showing an example of weight adjustment.

FIG. 6 illustrates an example of the weight selection GUI when the number of standard speakers is 1. In the example shown in FIG. 6, reference number 61 denotes an adjusting bar. Moving the adjusting bar 61 to an arbitrary position enables to arbitrarily change the interpolation ratio of the target speaker and the standard speaker (the left end corresponds to the target speaker, and the right end corresponds to the standard speaker). Note that in the example shown in FIG. 6, an extrapolation ratio can also be designated by, for example, locating the target speaker at 62 and the standard speaker at 63.

A GUI can also be used even when the number of standard speakers is 2. In this case, for example, the images of the target speaker, the first standard speaker, and the second standard speaker are displayed on the GUI screen in correspondence with the vertices of a triangle. The user indicates an arbitrary position inside or outside the triangle using a pointer. A weight can thus be specified by the relationship between the positions of the vertices of the triangle and the position of the pointer.

Interpolation of prosodic parameters will be described by exemplifying a case in which the number of standard speakers is 1. As described above, interpolation in this case includes both a case in which all weights are positive and a case in which a negative weight exists.

Figure 7:
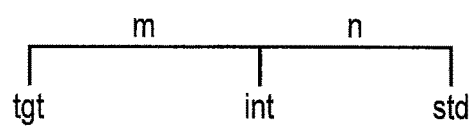
FIG. 7 is a view for explaining interpolation.

FIG. 7 shows interpolation by positive weights. In FIG. 7, tgt indicates the target speaker, std indicates the standard speaker, and int indicates an interpolation point when the weight of the target speaker is m, and that of the standard speaker is n. In this case, m≥0, and n≥0.

Figure 8:
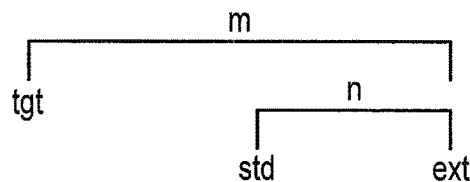
FIG. 8 is a view for explaining extrapolation.

FIG. 8 shows so-called extrapolation. In FIG. 8, ext indicates extrapolation when the weight of the target speaker is m, and that of the standard speaker is n. In this case, m≥0, and n≤0.

Note that FIG. 8 illustrates extrapolation that enhances the standard speaker. However, an extrapolation point that enhances the target speaker is also possible. In this case, m≤0, and n≥0.

Figure 9:
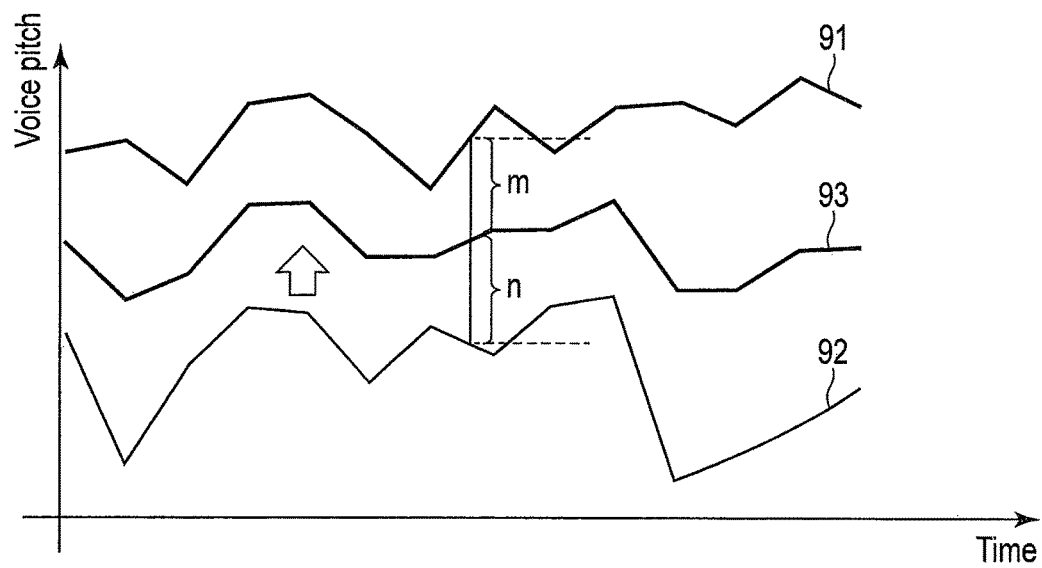
FIG. 9 is a timing chart for explaining interpolation processing.

FIG. 9 shows an example of interpolation of prosodic parameters when the number of standard speakers is 1. Referring to FIG. 9, reference number 91 denotes an F0 pattern of the target speaker; 92, an F0 pattern of the standard speaker; and 93, an F0 pattern interpolated by them. When performing the interpolation while setting the weights to m:n for the target speaker and the standard speaker, as shown in FIG. 9, the interpolation can be expressed as $$\frac{m \cdot std + n \cdot tgt}{m+n} (m \geq 0, n \geq 0) \quad (1)$$

Figure 10:
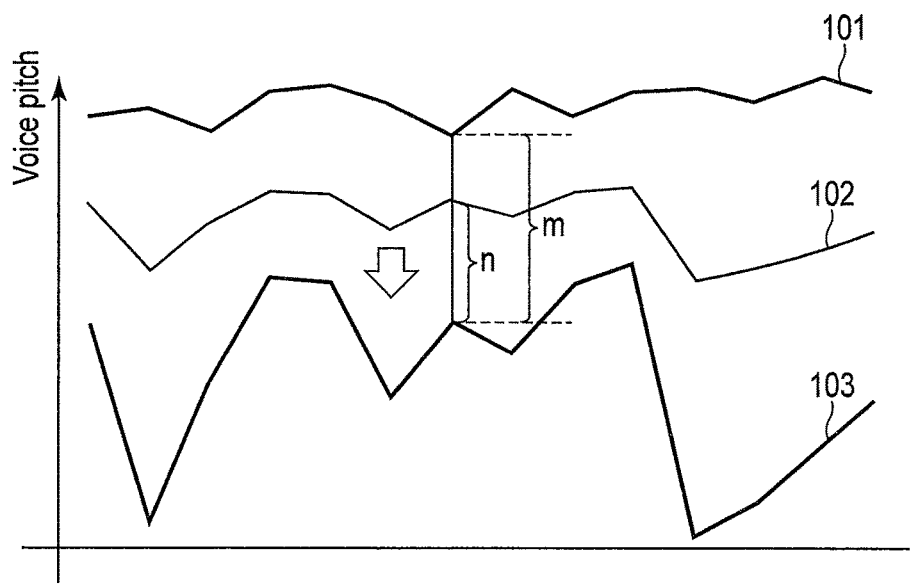
FIG. 10 is a timing chart for explaining extrapolation processing.

FIG. 10 shows an example of extrapolation of prosodic parameters when the number of standard speakers is 1. Referring to FIG. 10, reference number 101 denotes an F0 pattern of the target speaker; 102, an F0 pattern of the standard speaker; and 103, an F0 pattern extrapolated by them. When performing the extrapolation while setting the weights to m:n for the target speaker and the standard speaker, as shown in FIG. 10, the extrapolation can be expressed as $$\frac{m \cdot std + n \cdot tgt}{m+n} (m \geq 0, n \leq 0) \quad (2)$$

The other extrapolation can be expressed as $$\frac{m \cdot std + n \cdot tgt}{m+n} (m \leq 0, n \geq 0) \quad (3)$$

The interpolation (including extrapolation) when the number of standard speakers is n can be expressed as, for example, $$\frac{w0 \cdot tgt + w1 \cdot std1 + w2 \cdot std2 + \ldots + wn \cdot stdn}{w0 + w1 + w2 + \ldots + wn} \quad (4)$$

where stdi indicates the ith standard speaker, w0 is the weight of the target speaker, and wi is the weight of the ith standard speaker.

Various kinds of interpolation (including extrapolation) methods other than those described above are also possible.

Note that the weight information 901 can take various forms such as a form in which the weight information is input by the user, a form in which the weight information is given by another program (process), a form in which the weight information is given for each predetermined unit (for example, a sentence or a constituent element of a sentence) of the text, or a form in which the weight information is generated by causing the text analysis unit 1 to analyze the text.

Finally, the speech synthesis unit 6 generates synthesized speech in accordance with the phonological information and prosodic information designated by the synthesis parameter 501 (step S6).

As described above, according to this embodiment, the normalization processing of the prosodic parameters is performed before the interpolation processing of the prosodic parameters. This makes it possible to generate synthesized speech having a variety of prosodic features or prosodic features adapted to the tastes of the target speaker and maintain the personality of the target speaker.

(Second Arrangement Example of First Embodiment)

The second arrangement example of this embodiment will be described next.

Points different from the first arrangement example of the first embodiment will mainly be explained here.

FIG. 11 is a block diagram of a speech synthesis apparatus of this arrangement example.

This arrangement example is different from the first arrangement example (FIG. 2) in the normalization parameter generation unit 7.

Figure 3:
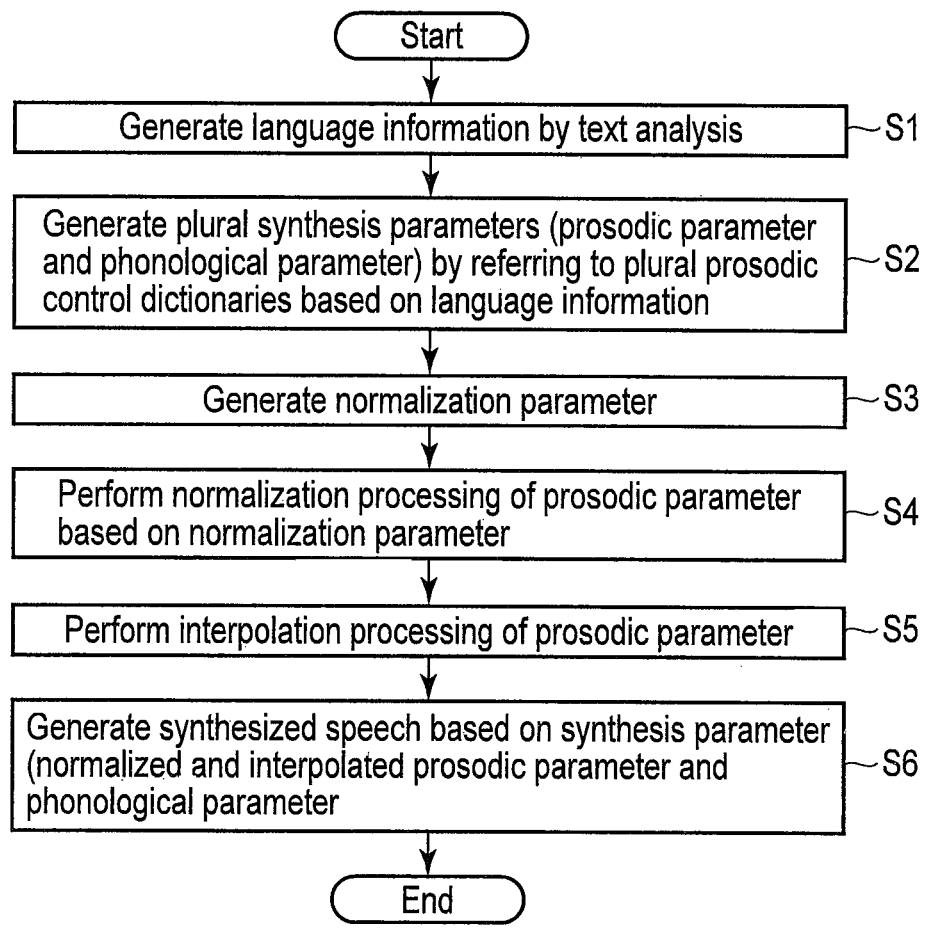
FIG. 3 is a flowchart showing an operation example of the speech synthesis apparatus according to the first embodiment.

An operation example of this arrangement example is basically the same as in FIG. 3. In this arrangement example, however, normalization parameter generation in step S3 may be performed before step S2 or before step S1. In addition, once the normalization parameter is generated at the first time of execution of the flowchart of FIG. 3 (or in other processing), the normalization parameter may be stored in a normalization parameter storage unit (not shown). When executing the flowchart of FIG. 3 later, the normalization parameter generation of step S3 may be omitted.

The normalization parameter generation unit 7 of this arrangement example statically generates, from the prosodic control dictionary of the target speaker and the prosodic control dictionary of one or each of a plurality of standard speakers, normalization parameters corresponding to them.

More specifically, for example, the average values of all representative F0 patterns stored in the prosodic control dictionary of the target speaker are calculated, and the average values of all representative F0 patterns stored in the prosodic control dictionaries of the standard speakers are calculated. The normalization parameters are obtained based on these average values, as in the first arrangement example.

For example, as described above in the first arrangement example, the normalization parameter is calculated by calculating the difference between the average values or calculating the difference and adding a predetermined threshold to the difference or multiplying the difference by a predetermined threshold as needed. Alternatively, the normalization parameter may be obtained by, for example, calculating the ratio to the average value of the target speaker on the basis of the average value of the standard speaker or calculating the ratio and adding a predetermined threshold to the ratio or multiplying the ratio by a predetermined threshold. As in the first arrangement example, the dynamic range and ratio may be used in place of the average value and difference.

(Third Arrangement Example of First Embodiment)

The third arrangement example of this embodiment will be described next.

Points different from the first and second arrangement examples of this embodiment will mainly be explained here.

In the first and second arrangement examples, the normalization parameter is obtained for each target speaker on the basis of the prosodic parameter of the target speaker, and the prosodic parameter is normalized based on the normalization parameter. Instead, a reference other than the prosodic parameter of the target speaker may be used. For example, the average value of a designated F0 pattern may be used as the reference in place of the average value of the F0 pattern of the target speaker.

In this case, even for the target speaker, the normalization parameter is obtained based on the average value of the designated F0 pattern, and the prosodic parameter is normalized based on the average value, like the standard speaker.

(Fourth Arrangement Example of First Embodiment)

The fourth arrangement example of this embodiment will be described next.

Points different from the first to third arrangement examples of this embodiment will mainly be explained here.

Each of the arrangements shown in FIGS. 1 and 11 includes the normalization parameter generation unit 7. However, the normalization parameter can also externally be acquired. In this case, the normalization parameter generation unit 7 is unnecessary, and the same arrangement as in FIG. 1 can be used.

(Second Embodiment)

The second embodiment will be described below.

In the first embodiment, interpolation processing is performed after normalization processing. In the second embodiment, normalization processing is performed after interpolation processing.

In this embodiment, points different from the first embodiment will mainly be explained.

FIG. 12 is an example of the block diagram of a speech synthesis apparatus according to the second embodiment.

As shown in FIG. 12, the speech synthesis apparatus according to this embodiment includes a text analysis unit 1, a prosodic control dictionary storage unit 2, a synthesis parameter generation unit 3, a synthesis parameter interpolation unit 5, a normalization unit (to be referred to as a second normalization unit hereinafter) 8 that performs normalization processing after interpolation processing, and a speech synthesis unit 6.

This embodiment will also be described using an F0 pattern as a detailed example of a prosodic parameter.

The points different from the first embodiment are the synthesis parameter interpolation unit 5 and the second normalization unit 8 of this embodiment. The synthesis parameter interpolation unit 5 performs interpolation processing of a prosodic parameter 301 generated from the prosodic control dictionary of the target speaker and a prosodic parameter 302 generated from the prosodic control dictionary of each standard speaker based on arbitrary weight information 901 before normalization processing. The second normalization unit 8 normalizes the interpolated prosodic parameters by a predetermined normalization parameter.

In this embodiment, various arrangement examples are available for normalization parameter generation and the like. Several arrangement examples will be described below in order.

(First Arrangement Example of Second Embodiment)

The first arrangement example of this embodiment will be described first.

FIG. 13 is a block diagram of a speech synthesis apparatus of this arrangement example.

As shown in FIG. 13, the speech synthesis apparatus of this arrangement example includes the text analysis unit 1, the prosodic control dictionary storage unit 2, the synthesis parameter generation unit 3, the synthesis parameter interpolation unit 5, a normalization parameter generation unit 7, the second normalization unit 8, and the speech synthesis unit 6.

Each unit will be described below.

The text analysis unit 1 and language information 101 are the same as in the first embodiment.

The prosodic control dictionary storage unit 2, the prosodic control dictionary of the target speaker, and the prosodic control dictionaries of the standard speakers are the same as in the first embodiment.

The synthesis parameter generation unit 3 generates the synthesis parameters (a phonological parameter and a first prosodic parameter) of the target speaker and the synthesis parameters (a phonological parameter and a second prosodic parameter) of each standard speaker by referring to their prosodic control dictionaries based on the language information 101. The prosodic parameter generation unit is part of the synthesis parameter generation unit 3.

The synthesis parameter interpolation unit 5 performs interpolation processing for the prosodic parameter 301 of the target speaker and the prosodic parameter 302 of each standard speaker based on the arbitrary weight information 901 to generate a third prosodic parameter, and outputs a synthesis parameter 502 including the third prosodic parameter and the phonological parameter. The prosodic parameter interpolation unit is part of the synthesis parameter interpolation unit 5.

The normalization parameter generation unit 7 generates a normalization parameter 702 from the prosodic parameter 301 of the target speaker on the basis of the interpolated prosodic parameter 502 using the method as described in the first embodiment.

The second normalization unit 8 performs normalization processing based on the normalization parameter 702 for the interpolated prosodic parameter 502 using the method as described in the first embodiment, and outputs a synthesis parameter 801 including the normalized third prosodic parameter and the phonological parameter.

The speech synthesis unit 6 generates synthesized speech in accordance with phonological information and prosodic information designated by the synthesis parameter 801.

An operation example of this arrangement example will be described next with reference to FIG. 14.

In this case, an F0 pattern is used as a detailed example of the prosodic parameter. As described above, however, the prosodic parameter is not limited to this.

First, the text analysis unit 1 generates the language information 101 (step S11).

Next, the synthesis parameter generation unit 3 generates the synthesis parameter of each speaker by referring to the prosodic control dictionary of the target speaker and the prosodic control dictionary of at least one standard speaker based on the language information 101 (step S12).

Next, the synthesis parameter interpolation unit 5 performs interpolation processing of the prosodic parameter 301 of the target speaker and the prosodic parameter 302 of each standard speaker based on the arbitrary weight information 901 (step S13).

Next, the normalization parameter generation unit 7 dynamically generates the normalization parameter 702 for the interpolated prosodic parameter 502 (step S14). For example, in the method when the number of standard speakers is 1 described in the first embodiment, the prosodic parameter 302 of the standard speaker is replaced with the interpolated prosodic parameter 502.

The second normalization unit 8 normalizes the interpolated prosodic parameter 502 using the normalization parameter 702 (step S15). For example, in the method when the number of standard speakers is 1 described in the first embodiment, the prosodic parameter 302 of the standard speaker is replaced with the interpolated prosodic parameter 502.

Finally, the speech synthesis unit 6 generates synthesized speech in accordance with the phonological information and prosodic information designated by the synthesis parameter 801 (step S16).

As described above, according to this embodiment, the normalization processing of the prosodic parameters is performed after the interpolation processing of the prosodic parameters. This makes it possible to generate synthesized speech having a variety of prosodic features or prosodic features adapted to the tastes of the target speaker and maintain the personality of the target speaker.

(Second Arrangement Example of Second Embodiment)

The second arrangement example of this embodiment will be described next.

Points different from the first arrangement example of the second embodiment will mainly be explained here.

FIG. 15 is a block diagram of a speech synthesis apparatus of this arrangement example.

This arrangement example is different from the first arrangement example (FIG. 13) in the normalization parameter generation unit 7.

An operation example of this arrangement example is basically the same as in FIG. 14. In this arrangement example, however, normalization parameter generation in step S14 may be performed before step S13, before step S12, or before step S11. In addition, once the normalization parameter is generated at the first time of execution of the flowchart of FIG. 14 (or in other processing), the normalization parameter may be stored in a normalization parameter storage unit (not shown). When executing the flowchart of FIG. 14 later, the normalization parameter generation of step S14 may be omitted.

The normalization parameter generation unit 7 of this arrangement example statically generates, from the prosodic control dictionary of the target speaker and the prosodic control dictionary of one or each of a plurality of standard speakers, normalization parameters as in the second arrangement example of the first embodiment. More specifically, for example, the average values of all representative F0 patterns stored in the prosodic control dictionary of the target speaker are calculated, and the average values (or weighted average values by weights assumed in advance) of all representative F0 patterns stored in the prosodic control dictionaries of all speakers are calculated. The normalization parameters are obtained based on these average values, as in the first arrangement example. Alternatively, a dynamic range may be used.

(Third Arrangement Example of Second Embodiment)

The third arrangement example of this embodiment will be described next.

Points different from the first and second arrangement examples of this embodiment will mainly be explained here.

In the first and second arrangement examples, the normalization parameter is obtained on the basis of the prosodic parameter of the target speaker, and the prosodic parameter is normalized based on the normalization parameter. Instead, a reference other than the prosodic parameter of the target speaker may be used. For example, the average value of a designated F0 pattern may be used as the reference in place of the average value of the F0 pattern of the target speaker.

(Fourth Arrangement Example of Second Embodiment)

The fourth arrangement example of this embodiment will be described next.

Points different from the first to third arrangement examples of this embodiment will mainly be explained here.

Each of the arrangements shown in FIGS. 13 and 15 includes the normalization parameter generation unit 7. However, the normalization parameter can also externally be acquired. In this case, the normalization parameter generation unit 7 is unnecessary, and the same arrangement as in FIG. 12 can be used.

Note that in the embodiments described above, a model based on a representative pattern has been assumed. However, in, for example, source filter speech synthesis represented by speech synthesis based on a hidden Markov model, any other model such as a vocal tract model can also be used. In this case, the prosodic control dictionaries, synthesis parameter generation, normalization parameter generation, and the like are modified appropriately.

For example, in the first embodiment, the normalization parameter generation unit may generate the normalization parameter based on a predetermined prosodic parameter statistic corresponding to the prosodic control dictionary of the target speaker and a predetermined prosodic parameter statistic corresponding to the prosodic control dictionary of a standard speaker.

For example, in the second embodiment, the normalization parameter generation unit may generate the second normalization parameter based on a predetermined prosodic parameter statistic corresponding to the prosodic control dictionary of the target speaker and a predetermined prosodic parameter statistic corresponding to the prosodic control dictionary of a standard speaker (or also based on weight information).

As described above, according to the embodiments, normalization processing of prosodic parameters is performed before or after interpolation processing of the prosodic parameters. It is therefore possible to generate synthesized speech having a variety of prosodic features and maintain the personality of the target speaker.

Also, instructions described in the processing sequences in the aforementioned embodiment can be executed based on a program as software. A general-purpose computer system may store this program in advance, and may load this program, thereby obtaining the same effects as those of the speech synthesis apparatus of the aforementioned embodiment. Instructions described in the aforementioned embodiment are recorded, as a computer-executable program, in a magnetic disk (flexible disk, hard disk, etc.), an optical disk (CD-ROM, CD-R, CD-RW, DVD-ROM, DVD±R, DVD±RW, etc.), a semiconductor memory, or a recording medium equivalent to them. The storage format is not particularly limited as long as the recording medium is readable by a computer or embedded system. When the computer loads the program from this recording medium, and controls a CPU to execute the instructions described in the program based on that program, the same operations as those of the speech synthesis apparatus of the aforementioned embodiment can be implemented. Of course, the computer may acquire or load the program via a network.

Based on the instruction of the program installed from the recording medium in the computer or embedded system, an OS (Operating System), database management software, MW (middleware) of a network, or the like, which runs on the computer may execute some of processes required to implement this embodiment.

Furthermore, the recording medium of this embodiment is not limited to a medium independent of the computer or embedded system, and includes that which stores or temporarily stores a program downloaded from a LAN or the Internet.

The number of recording media is not limited to one. The recording medium of this embodiment also includes a case in which the processes of this embodiment are executed from a plurality of media, and the configurations of the media are not particularly limited.

Note that the computer or embedded system of this embodiment executes respective processes of this embodiment based on the program stored in the recording medium, and may be any of an apparatus including one of a personal computer, microcomputer, and the like, or a system obtained by connecting a plurality of apparatuses via a network.

The computer of this embodiment is not limited to a personal computer, and includes an arithmetic processing device, microcomputer, or the like included in an information processing apparatus. Hence, the computer of this embodiment is a genetic name of a device or apparatus which can implement the functions of this embodiment by means of the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesis apparatus comprising:
a text analysis unit configured to analyze an input text and output language information including information on prosodic control of speaker;
a dictionary storage unit configured to store a first prosodic control dictionary of a target speaker and a second prosodic control dictionary of each of a plurality of standard speakers;
a prosodic parameter generation unit configured to generate a first prosodic parameter using the first prosodic control dictionary and generate a plurality of second prosodic parameters using the second prosodic control dictionary, based on the language information, the first prosodic parameter changing between speakers and being generated for each speaker;
a normalization unit configured to normalize the plurality of second prosodic parameters based a normalization parameter, the normalized second prosodic parameters each being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from an average of an F0 pattern of the target speaker;
a prosodic parameter interpolation unit configured to interpolate the first prosodic parameter and the plurality of normalized second prosodic parameters based on weight information to generate a third prosodic parameter;

a speech synthesis unit configured to generate synthesized speech in accordance with the third prosodic parameter; and a normalization parameter generation unit configured to generate the normalization parameter based on a first predetermined prosodic parameter statistic corresponding to the first prosodic control dictionary and a second predetermined prosodic parameter statistic corresponding to the second prosodic control dictionary.

2. The apparatus according to claim 1, further comprising a normalization parameter generation unit configured to generate the normalization parameter based on the first prosodic parameter and the plurality of second prosodic parameters.

3. The apparatus according to claim 1, wherein the normalization parameter is a preset parameter.

4. The apparatus according to claim 1, wherein the normalization unit is further configured to normalize the first prosodic parameter, and the prosodic parameter interpolation unit interpolates the normalized first prosodic parameter and the plurality of normalized second prosodic parameters.

5. The apparatus according to claim 1, wherein the first prosodic control dictionary includes parameters used to control prosody of the target speaker.

6. The apparatus according to claim 1, wherein the first prosodic parameter and the second prosodic parameters change between speakers.

7. The apparatus according to claim 1, wherein the normalizing is performed such that at least one of averages of the second prosodic parameters matches or becomes close to an average of the first prosodic parameter.

8. A speech synthesis apparatus comprising:
a text analysis unit configured to analyze an input text and output language information including information on prosodic control of speaker;
a dictionary storage unit configured to store a first prosodic control dictionary of a target speaker and a second prosodic control dictionary of each of a plurality of standard speakers;
a prosodic parameter generation unit configured to generate a first prosodic parameter using the first prosodic control dictionary and generate a plurality of second prosodic parameters using the second prosodic control dictionary, based on the language information, the first prosodic parameter changing between speakers and being generated for each speaker;
a prosodic parameter interpolation unit configured to interpolate the first prosodic parameter and the plurality of second prosodic parameters based on weight information to generate a third prosodic parameter;
a normalization unit configured to normalize the third prosodic parameter based a normalization parameter, the normalized third prosodic parameter being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from to an average of an F0 pattern of the target speaker;
a speech synthesis unit configured to generate synthesized speech in accordance with the normalized third prosodic parameter; and a normalization parameter generation unit configured to generate the normalization parameter based on a first predetermined prosodic parameter statistic corresponding to the first prosodic control dictionary, a second predetermined prosodic parameter statistic corresponding to the second prosodic control dictionary, and the weight information.

9. The apparatus according to claim 8, further comprising a normalization parameter generation unit configured to generate the normalization parameter based on the first prosodic parameter and the generated third prosodic parameter.

10. The apparatus according to claim 8, wherein the normalization parameter is a preset parameter.

11. The apparatus according to claim 8, wherein the first prosodic control dictionary includes parameters used to control prosody of the target speaker.

12. The apparatus according to claim 8, wherein the first prosodic parameter and the second prosodic parameters change between speakers.

13. The apparatus according to claim 8, wherein the normalizing is performed such that at least one of averages of the second prosodic parameters matches or becomes close to an average of the first prosodic parameter.

14. A speech synthesis method of a speech synthesis apparatus, comprising:
analyzing an input text and outputting language information including information on prosodic control of speaker;
storing a first prosodic control dictionary of a target speaker and a second prosodic control dictionary of each of a plurality of standard speakers;
generating a first prosodic parameter using the first prosodic control dictionary and generating a plurality of second prosodic parameters using the second prosodic control dictionary, based on the language information, the first prosodic parameter changing between speakers and being generated for each speaker;
normalizing the plurality of second prosodic parameters based a normalization parameter, the normalized second prosodic parameters each being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from an average of an F0 pattern of the target speaker;
interpolating the first prosodic parameter and the plurality of normalized second prosodic parameters based on weight information to generate a third prosodic parameter;
generating synthesized speech in accordance with the third prosodic parameter; and
generating the normalization parameter based on a first predetermined prosodic parameter statistic corresponding to the first prosodic control dictionary and a second predetermined prosodic parameter statistic corresponding to the second prosodic control dictionary.

15. A speech synthesis method of a speech synthesis apparatus, comprising:
analyzing an input text and outputting language information including information on prosodic control of speaker;
storing a first prosodic control dictionary of a target speaker and a second prosodic control dictionary of each of a plurality of standard speakers;

generating a first prosodic parameter using the first prosodic control dictionary and generating a plurality of second prosodic parameters using the second prosodic control dictionary, based on the language information, the first prosodic parameter changing between speakers and being generated for each speaker;

interpolating the first prosodic parameter and the plurality of second prosodic parameters based on weight information to generate a third prosodic parameter;

normalizing the third prosodic parameter based a normalization parameter, the normalized third prosodic parameter being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from an average of an F0 pattern of the target speaker;

generating synthesized speech in accordance with the normalized third prosodic parameter; and generating the normalization parameter based on a first predetermined prosodic parameter statistic corresponding to the first prosodic control dictionary, a second predetermined prosodic parameter statistic corresponding to the second prosodic control dictionary, and the weight information.

16. A non-transitory computer-readable medium storing a computer program which is executed by a computer to provide the steps of:

analyzing an input text and outputting language information including information on prosodic control of speaker;

storing a first prosodic control dictionary of a target speaker and a second prosodic control dictionary of each of a plurality of standard speakers;

generating a first prosodic parameter using the first prosodic control dictionary and generating a plurality of second prosodic parameters using the second prosodic control dictionary, based on the language information, the first prosodic parameter changing between speakers and being generated for each speaker;

normalizing the plurality of second prosodic parameters based a normalization parameter, the normalized second prosodic parameters each being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from an average of an F0 pattern of the target speaker;

interpolating the first prosodic parameter and the plurality of normalized second prosodic parameters based on weight information to generate a third prosodic parameter;

generating synthesized speech in accordance with the third prosodic parameter; and generating the normalization parameter based on a first predetermined prosodic parameter statistic corresponding to the first prosodic control dictionary and a second predetermined prosodic parameter statistic corresponding to the second prosodic control dictionary.

17. A non-transitory computer-readable medium storing a computer program which is executed by a computer to provide the steps of:

analyzing an input text and outputting language information including information on prosodic control of speaker;

storing a first prosodic control dictionary of a target speaker and a second prosodic control dictionary of each of a plurality of standard speakers;

generating a first prosodic parameter using the first prosodic control dictionary and generating a plurality of second prosodic parameters using the second prosodic control dictionary, based on the language information, the first prosodic parameter changing between speakers and being generated for each speaker;

interpolating the first prosodic parameter and the plurality of second prosodic parameters based on weight information to generate a third prosodic parameter;

normalizing the third prosodic parameter based a normalization parameter, the normalized third prosodic parameter being close to the first prosodic parameter, the normalization parameter being set to a sum of a difference and a threshold, the sum being added to an F0 pattern of each of the plurality of standard speakers, the difference being calculated by subtracting an average of an F0 pattern of each of the plurality of standard speakers from an average of an F0 pattern of the target speaker;

generating synthesized speech in accordance with the normalized third prosodic parameter; and generating the normalization parameter based on a first predetermined prosodic parameter statistic corresponding to the first prosodic control dictionary, a second predetermined prosodic parameter statistic corresponding to the second prosodic control dictionary, and the weight information.

* * * * *